United States Patent [19]

Carlson et al.

[11] Patent Number: 4,658,886
[45] Date of Patent: Apr. 21, 1987

[54] HIGH TEMPERATURE MOLDS AND COMPOSITION FOR SAME

[75] Inventors: Walter H. Carlson, Aurora; Kevin L. Burmeister, Kent, both of Ohio

[73] Assignee: Graphite Sales, Inc., Chagrin Falls, Ohio

[21] Appl. No.: 774,998

[22] Filed: Sep. 11, 1985

[51] Int. Cl.⁴ .......................... B22C 1/22; B22C 9/00
[52] U.S. Cl. ................................ 164/526; 164/529; 164/364; 523/144
[58] Field of Search .............. 164/520, 521, 526, 527, 164/529, 27, 364; 523/143, 144, 145

[56] References Cited

U.S. PATENT DOCUMENTS

| | | | |
|---|---|---|---|
| 3,103,719 | 9/1963 | Bishop et al. | 164/520 |
| 4,134,442 | 1/1979 | Laitar | 164/526 |
| 4,430,459 | 2/1984 | Akerburg et al. | 523/144 |
| 4,478,269 | 10/1984 | Akerburg | 164/526 |

OTHER PUBLICATIONS

ERICO ® Products, Inc., brochure No. A-1A-01 entitled Cadweld ® Grounding Connections, dated 1978 (cover page and last two pages thereof).

Primary Examiner—Nicholas P. Godici
Assistant Examiner—Richard K. Seidel
Attorney, Agent, or Firm—Body, Vickers & Daniel

[57] ABSTRACT

A high temperature mold assembly particularly adapted for thermit reaction welding, and mold components and mold compositions therefor, based on a mined aggregate containing carbon and silica and thermosetting, non-hygroscopic resinous binder.

32 Claims, 3 Drawing Figures

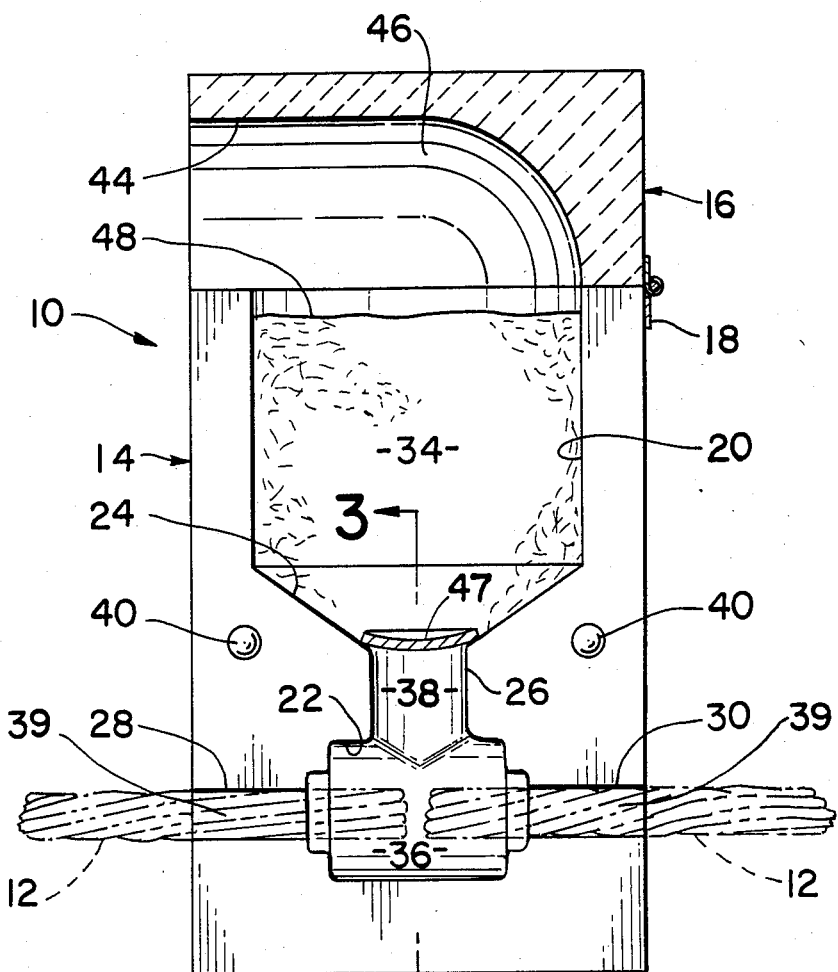
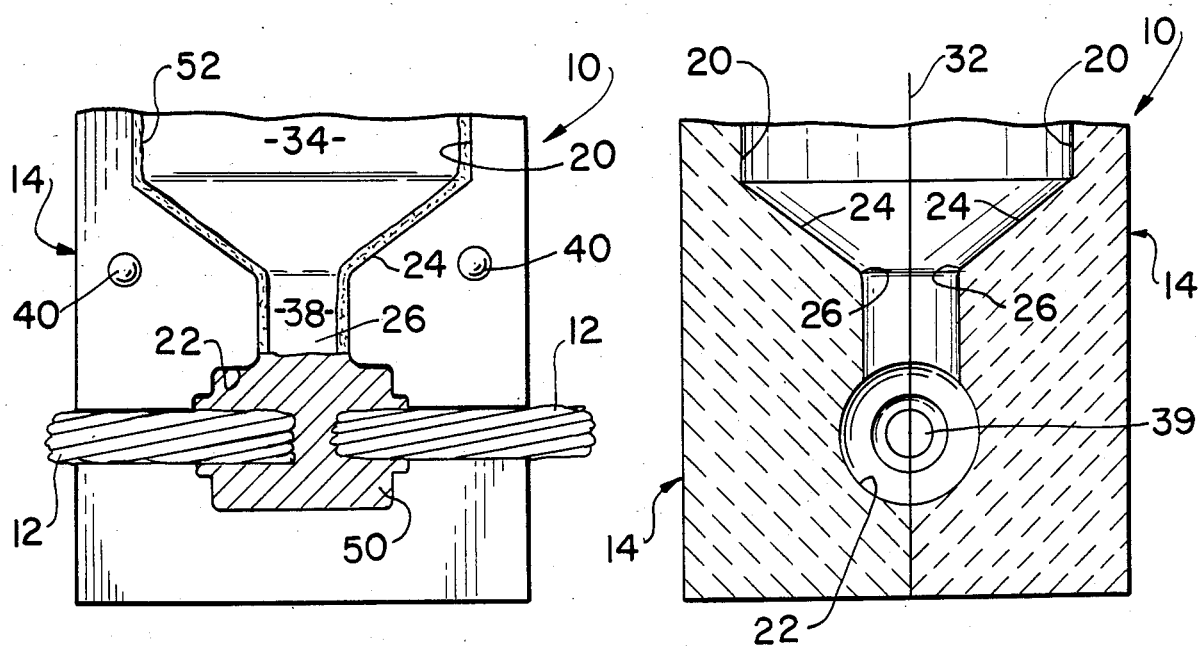
FIG. 1
FIG. 3
FIG. 2

HIGH TEMPERATURE MOLDS AND COMPOSITION FOR SAME

The present invention relates to high temperature molds, and in particular, to a mold composition and mold assembly for thermit reaction welding.

BACKGROUND

The present invention is particularly applicable to thermit welding and will be described with particular reference thereto; however, it will be apparent that the invention has broader applications for a variety of retention and reaction vessels and molds where thermal stability and high refractory properties are required for the reaction and retention of molten metals. Thermit reaction welding is extensively used to provide on-site interconnection between current carrying and/or load bearing members. For example, the weld produced in thermit reaction welding can be used to splice cables to one another, to interconnect cables to ground rods or bus bars, to structurally and electrically interconnect bus bars, to connect cable to pipes, rails, lugs as well as many other applications where current carrying, strength and durability properties are required. In this connection, the resulting weld from the thermit reaction has current carrying capacity and strength properties equalling or exceeding those of the connector members being joined. The thermit weld connection provides a permanent molecular bond between the connector members that does not loosen or corrode, can be made with inexpensive light weight, on-site equipment without external power or heat, and without specialized job skills. The welded joint can be visually checked for quality. The thermit reaction welding process is well suited for joining cables together or to ground or support structures of the same or similar materials and, therefore, the present invention will be particularly described with reference thereto. At the same time however, it will be appreciated that the invention is applicable to the thermit welding of a wide variety of components and structures whereby it will be understood that the description with reference to the welding of ground cables is intended to be illustrative of the invention and not limiting with respect thereto.

The basic thermit reaction takes place within the confines of a high temperature reaction mold. The mold includes a weld cavity having a shape generally defining the intended configuration of the weld and in connection with the welding of cables, passages are provided for inserting and supporting the terminal portions of the cable in prepositioned relation to one another within the weld cavity. The weld cavity communicates with an upwardly opening crucible by means of a tap hole. The tap hole is sealed by a disc and the crucible is filled with a combination of powdered metals, one of which is an oxide of the weld metal and the other which is generally aluminum powder. A suitable starting material such as magnesium powder is sprinkled over the top of the powdered metals. By means of a flint ingitor or other starting device, the starting material is ignited which initiates an exothermic reduction reaction in the crucible between the powdered metals. This reduction reaction produces a molten base metal and an aluminum oxide slag. The molten base metal melts through the disc and flows downwardly into the weld cavity and around the cables, thereby locally melting the ends of the cable and, upon solidification, forming an integral connector joint conforming to the weld cavity contour.

These reactions molds are assembled from multiple parts to provide the necessary separation of the parts for release of the welded joint following the thermit welding process. The number of parts and their interfitting varies from application to application as required to provide for the separation without destruction of the mold parts in order that reaction mold may be reused on a semi-permanent basis. Because the reactions molds must withstand extremely high temperatures, in the range of 5000° F. or higher, graphite has been generally employed as the reaction mold material. Graphite provides the advantages of high temperature resistance and nonwetting of the slag or the weld material, the latter allowing for easy removal of the slag and the completed welded joint from the mold. However, graphite has significant thermal conductivity which requires that special equipment such as gloves or the like be provided for the welder to permit safe separation of the mold parts. Moreover, graphite is an expensive material and, because of its physical characteristics, does not lend to the forming of mold parts other than by conventional machining operations such as cutting, milling, boring and the like to provide the necessary cavities and passage ways in the assembled mold. Consequently, a graphite mold is expensive, and is complex and difficult to manufacture and use.

It has been suggested that some of the above-mentioned difficulties associated with the manufacture of graphite molds could be overcome by the use of moldable refractory materials to form the mold parts. In this respect, the mold parts would be formed to the desired shape relative to the parting surfaces required for mold separation of the parts to accommodate removal of the molded joint. Therefore, the parts would have the required cavities and connector openings appropriately formed during the molding process, advantageously overcoming the need for numerous and time consuming machining operations. Such approaches are focused on forming the mold parts from an aggregate of a suitable mixture of temperature resistant and refractory materials which are adhesively bonded by organic resins. However, these previous efforts have not provided satisfactory results in the thermit reaction welding process. More particularly, the materials heretofore proposed as binders have included curable water-based organic binders of high moisture content. Therefore, unless the formed mold parts are thoroughly dried over extended drying periods, and then assembled and used rather quickly, the mold may have an unacceptable moisture content at time of use. This retention of moisture is potentially dangerous and undesirable in that, when a thermit reaction is initiated, the resulting temperatures in the mold may be sufficient to produce fragmentation or fracturing of the mold components due to water-steam expansion therein. Further, these binders tend to be hygroscopic, whereby the potential for absorbing moisture prior to use or during periods of storage or nonuse increases potential for fracturing and fragmentation. Further, either as a result of the moisture problem and/or the aggregates used, the aggregate often contaminates the base metal through impurities which can enter the molten metal. This can result in inclusions which impair the electrical and mechanical properties of the end product. Because the thermit weld relies in its simplicity upon a visual indication of acceptable weld quality, this potential for contamination can lead to a rejection of such a mold material when the user requires stringent weld quality. Moreover, such inclusions of aggregate in the end product necessarily results in mold errosion and a lessening of useful mold life.

BRIEF SUMMARY OF THE INVENTION

In accordance with the present invention, a high temperature mold is provided which minimizes or overcomes the foregoing and other disadvantages associated with both graphite molds and curable aggregate molds heretofore available. More particularly, a mold composition is provided which, when cured, is substantially moisture free, thus minimizing the potential for fracturing due to internal steam pressures. The mold composition can be readily molded to the desired final component configuration thereby eliminating or minimizing the need for machining. Further, the mold composition is readily cured and the curing is controlled to provide high strength and desirable temperature and refractory qualities, and the composition is non-hygroscopic in nature which assures a long shelf life prior to use. The mold component has high temperature properties which are resistant to thermal shock at the temperatures employed in thermit welding. The high temperature strength reduces the aforementioned contamination problem of prior mold compositions and provides a structually sound high quality weld. The mold parts have improved refractory properties and low thermal conductivity which provides a post welding mold part temperature which permits separation of the mold parts without special work or protection.

More particularly, in accordance with the present invention, the mold composition is comprised of an aggregate and a non-hygroscopic thermosetting resin system. The preferred aggregate has a high carbon and silica content. The high carbon content provides structural integrity, good thermal characteristics and a mold surface which is not wetted by the molten metal. Thus, potential contamination of the weld metal by degradation of the mold material is minimized. The high silica content provides improved refractory characteristics and little thermal conductivity permitting easy and safe handling on the job site. The high carbon and silica content also advantageously enables the use of a low cost mine product known as Black Diamond. As mined, Black Diamond has alternating parallel plates of carbon and silica. It has been found that this unique orientation of the carbon and silica content provides excellent thermal shock properties, providing improved thermal shock resistance over a homogeneous admixture of carbon and silica. The Black Diamond mined mixture also provides improved green strength properties over an admixture of carbon and silica particles. The non-hygroscopic thermosetting resin system enables the mold components to be cured without subsequent concern for moisture absorption on the shelf or in the field. The resin system may be enhanced by using a mixture of thermosetting resins having different polymerization temperatures. The resulting composition is readily molded with moderate pressures, and curing is controlled as a result of the binders to provide a mold part having optimum high strength, thermal and refractory properties.

The mold composition is prepared by mixing in appropriate portions, a combination of the aggregate with the thermosetting resin binder. The resulting mixture is then formed to component shape under moderate compression molding pressures in the range of 1,000 to 4,000 psi. Depending on the thermosetting temperatures of the resin system, the molded part is heated in an oven at a temperature not substantially above the highest polymerization temperature of the resins used in the thermosetting resin system, and for a sufficient time to ensure complete polymerization of the resin system. The cured mold part is moisture-free with low hygroscopicity, and has smooth surfaces accurately corresponding to the mold configuration without the need for subsequent machining. Individual mold configurations for various types of connections can be made by the interassembly of standard components at the welding site.

Accordingly, it is an object of the present invention to provide a high temperature mold composition which, when cured, has high strength, thermal and refractory properties.

Another object of the present invention is to provide non-hygroscopic high temperature reaction and retention molds and mold parts having improved shelf life characteristics.

A further object of the present invention is the provision of a mold composition using a mined aggregate and a binder system which, when cured, provides a high temperature vessel having improved thermal shock characteristics.

Yet another object is the provision of a cured high temperature molded component comprised of a mined aggregate having a high carbon and silica content and first and second non-hygroscopic thermosetting resins which are readily moldable and cured to provide a molded part having thermal and refractory properties compatible with thermit reaction welding.

Yet a further object of the present invention is the provision of a thermit reaction mold assembly using molded components which minimize and eliminate the need for post molding machining.

BRIEF DESCRIPTION OF THE DRAWINGS

A preferred embodiment of the present invention is illustrated in the accompanying drawings in which:

FIG. 1 is a sectional view of an assembly of mold parts made in accordance with the present invention and providing a thermit mold for welding cables.

FIG. 2 is a fragmentary sectional view taken along line 2—2 of FIG. 1; and,

FIG. 3 is a fragmentary sectional view of the thermit mold shown in FIG. 1 showing the cables, the connector joint, and the slag material subsequent to the thermit reaction.

DETAILED DESCRIPTION OF THE PREFERRED EMBODIMENT

Referring to the drawings for the purpose of illustrating the preferred embodiment only, FIG. 1 shows a separable, high temperature mold assembly 10 for the thermit welding and interconnecting of two coaxially aligned ground cables 12. It will hereinafter become apparent however, that the mold assembly of the present invention can be beneficially used in the various types of thermit reaction welding applications used for the on-site electrical and mechanical interconnection of components.

More particularly, as shown in FIGS. 1 and 2, the mold assembly 10 comprises two identical body pieces 14, only one of which is visible in FIG. 1, and a cover 16. The body pieces 14 and the cover 16 are molded as individual pieces, as described in detail below, preferably from an aggregate comprised of carbon and silica and through the use of a polymerized, non-hygroscopic thermosetting resin binder system.

In on-site assembly, the body pieces 12 are held in abutting relationship by suitable conventional clamps or fixtures, not shown, and the cover 16 may be pivotally connected to one of the body pieces 14 by a suitable hinge 18. The mold pieces 14 are disassembled subsequent to a thermal welding reaction to remove the completed connector assembly without destruction of the molded components.

The abutting inner side of each body piece 14 is contoured to provide a crucible recess 20 of semi-circular profile and extending downwardly from the upper end thereof, and a weld cavity recess 22 of semi-circular cross section transversely oriented and centrally formed in the lower end of the body piece 14. The crucible recess 20 and the weld cavity recess 22 are interconnected by a frustoconical recess 24 and a tap hole recess 26 of semi-circular cross section. Laterally extending recesses 28 and 30 are provided in the lower ends of each body piece 14 coaxial with the weld cavity recess 22. In assembled relationship, with the innersides of each body piece 14 abutting at a vertical plane 32, the recesses 20, 24 and 26 are symmetrically formed in each body piece 14 and coaxially disposed about a vertical axis. The recesses 22, 28 and 30 are symmetrically formed in each body piece with respect to the vertical plane 32 and commonly coaxially disposed with reference to a horizontal axis. The aforementioned recesses cooperate in assembly to define an upwardly opening cylindrical crucible 34 in the upper end and an interior weld cavity 36 in the lower end interconnected by a tap hole 38. The recesses 28 and 30 cooperate in assembly to provide cylindrical passages 39 coaxially communicating with the weld cavity 36. One of the body pieces 14 is provided with a pair of projecting dowel pins 40 which are received in correspondingly formed recesses, not shown, in the other body piece to provide alignment between the respective body pieces prior to clamping. The lower surface of the cover 18 is provided with an outwardly opening groove 44. With the cover 18 in the closed position shown in FIG. 1, the groove 44 defines a spark ingition tunnel 46 communicating with the crucible 34.

It will be appreciated of course that the size of the weld cavity 36 and the size, number and location of the cable passages can differ from that shown in number, size and orientation as required to accommodate the particular welding application. Further, configuration and orientation of the connector members may require a greater number of innerfitting mold parts to permit separation of the mold parts subsequent to the thermit welding reaction.

To form a welded connector for electrically and for mechanically joining the cables 12, the terminal portions of each cable 12 are inserted through the horizontal cable passages 39 so as to position their inner ends in closely spaced relationship and symmetrically disposed within the weld cavity 36 as shown in FIG. 1. The body pieces 14 are then fixedly clamped together to retain the cable positioning. A meltable annular steel disc 47 is positioned in the base of the crucible 34 to cover the tap hole 38 formed by the recesses 26. With the cover 16 in its open position, an appropriate mixture of weld metal comprising, for example, a mixture of copper oxide powder and aluminum powder is poured into the crucible 34 to an appropriate level such as indicated at 48. A suitable spark ignitable starting material such as magnesium powder is sprinkled over the top surface of the weld metal. The cover 16 is moved to the closed position. By means of a flint ignitor or other suitable device, a spark or flame is directed through the tunnel 46 onto the starting material. The starting material is thereby ignited initiating an exothermic reduction reaction between the copper oxide and aluminum. This reaction forms a molten pool of copper with an upper slag of aluminum oxide. At the reaction temperature, the disc 47 is melted and the molten copper flows downwardly through the tap hole 38 substantially filling the weld cavity 36 and surrounding the ends of the cable 12 to form, as shown in FIG. 3, a connector 50 generally conforming to shape of the weld cavity 36. The molten weld metal locally melts the inner ends of the cables 12 and forms a permanent molecular fusion bond therebetween. The overall solidified configuration of the connector 50 is conventionally designed to provide the desired structural strength and electrical current carrying capacity for the connector assembly application. Upon solidification, an aluminum slag 52 peripherally adheres to the surfaces 26 of the tap hole 38 and the recesses 24 and 20 of the crucible 34. Upon release of the clamps holding the body pieces together, the body pieces 14 are freely separated from the cables 12 and the solidified connector 50, and the slag 52 are readily removed from the connector 50 and/or the adhering surfaces of the tap hole 38 and the crucible 34.

In the mold assembly 10 shown in FIGS. 1 through 3, the body pieces are symmetrically formed with respect to the abutting parting surfaces and the various recess surfaces are completely molded as hereinafter described. However, it should be appreciated that in order to provide greater versatility, the upper end of the mold assembly 10 may be formed with a single body piece fully defining the crucible 34 and all or part of the tap hole 38. This would provide the benefit of standardized crucible configuration for the variety of thermit welding applications. The lower end of the assembly could then be comprised of a plurality of molded components interfitting to provide the passages and weld cavity for the particular application and suitably provided with passages communicating with the standard crucible portions. These interfitting mold parts would also be fully molded and separable upon completion of the welding process to release the completed connector assembly without destruction of the mold parts. While the fully molded configuration provides obvious benefits, it should be appreciated however that the various passages for the cables or connectors could be additionally machined to accommodate differing sizes and configurations from a limited number of molded parts.

The individual mold components described above are compression molded from a mold composition comprising a carbon and silica aggregate in a thermosetting resin binder system which, upon curing, forms a non-hygroscopic matrix of the aggregate with the cured resin. Preferably, the mold composition comprises by precured weight about 88–92½% aggregate and about 7½–12% resinous binder, not including volatiles.

A preferred aggregate from the standpoint of availability, economy, moldability and performance characteristics is comprised of a relatively inexpensive mine material known as Black Diamond. Black Diamond is available from a mine of the same name in Townsend, Montanna and is characterized by high carbon and silica content. While this is a preferred aggregate for the aforementioned reasons, it will be apparent that many of the benefits of the present invention can also be provided from synthesized mixtures of carbon and silica.

More particularly, the approximate composition of Black Diamond, as dried, for use as an aggregate herein, comprises by weight about 26% to 29% fixed carbon, about 8% volatiles and about 62% to about 65% ash. The approximate mineral analysis of the ash is about 47.5% to about 50% silica, about 8% to 8.4% aluminum, about 2.8% to about 3% aluminum oxide, about 1.5% to about 1.6% potasium oxide and trace amounts of magnesia, lime, platinum oxide, sulfur oxide, sulfur trioxide, potassium pentoxide and unknowns.

The mined mixture has a moisture content of about 3% and is dried to a moisture content of less than 1% for use in the molding composition of the present invention. The carbon and silica are present in alternating parallel plates. This platelike configuration of the carbon and silica layers has been found to provide improved thermal shock resistance by accommodating expansion along the matrix layers. The synthesized mixture of carbon and silica appears to be less resistant to the thermal shock experienced in thermit welding, typically involving thermal excursions of about 5000° F., presumably due to the homogeniety of the mixture. The mined aggregate is preferably pulvurized to a fine particulate size having a screen size of about 10 by 0. This sizing has been found to yield a readily molded, smooth parting surface for a connector assembly while retaining a desirable platelike configuration of the carbon and silica layers.

The preferred mold composition comprises by weight, 90% Black Diamond based aggregate and 10% resinous binder system. Additional carbon in the form of graphite powder may be mixed with the Black Diamond to provide a standardized content, by weight prior to curing, having a carbon content of about 35-39%, a silica content of about 32-34% and an alumina content of about 5 to about 7%. It has been found that these proportions provide a mold component having optimum green strength, and desirable thermal, refractory and hygroscopic characteristics in combination with the cured binder system. As previously mentioned, the aggregate may be beneficially provided by Black Diamond alone or by combinations of the foregoing carbon, silica and aluminum contents. However, Black Diamond, as a readily available natural source provides for more economical production of the composition, both from the standpoint of cost and preparation time.

The thermosetting resinous binder system comprises non-water based thermosetting resin mixtures, preferably having differing polymerization temperatures and including at least one phenolic resin. Most preferred is a mixture containing one or more phenolic binders together with a furan binder.

These thermosetting resins can be obtained separately and combined in the mold composition mixing process. In the preferred embodiment however, a suitable mixture of equal parts by cured weight of a phenolic binder and a furan binder are used. Such a mixture can be obtained from the Ashland Chemical Company of Columbus, Ohio under the latter's product designation 65-046. Therein, the phenolic binder has a polymerization temperature of about 120° F. and the furan binder has a polymerization temperature of about 300° F. The binders in the composition have a curing temperature of about 350° F. to 400° F. with a curing time of about 4 hours for each two inches of molded composition cross section at the aforementioned curing temperature. This binder system will also fully cure at lower temperatures over more extended curing periods.

The furan and phenolic binder system provide in combination, a controlled curing of the mold material to optimize the cured strength and thus retention of the aggregate against dispersion in the weld metal or adherance to the weld cavity surfaces. The phenolic binder, alone, will provide for a quick cure of the composition, but upon full cure may not provide the desired ultimate strength. However, the low polymerization temperature advantageously provides curing commencing at lower temperatures. The relatively high polymerization temperature of the furan resin provides the desired ultimate strength. When combined with the quick cure characteristics of the phenolic resin, a binder system having a broad operating temperature range through which curing takes place is advantageously provided. The resultantly cured composition has a greater strength than could be achieved with either binder alone.

A further important advantage of the nonwater based resins, is that the resulting cured and dried product is essentially free of moisture and is non-hygroscopic. Accordingly, exposure to moisture in storage or prior to use will not adversely effect mold part strength or durability during the welding process.

Notwithstanding the benefits provided by the above furan and phenolic mixtures, it will be appreciated that other suitable thermosetting binders could be used to provide progressive curing through differing polymerization temperatures, a non-hygroscopic cured matrix and a strong adhesive bond to the various components in the mold composition aggregate.

The mold composition is preferably packaged as a mixture containing both the binder system and the aggregate. However, the same may be separately packaged and mixed at the site of mold part manufacture. In either event, the aggregate and the resin system should be thoroughly mixed to provide a uniformly dispersed admixture. A suitable compression mold having conventionally designed configurations producing the desired mold part configuration may be used for compression forming the composition to its green strength. A low molding pressure of around 1,000–4,000 psi has been found to provide a green strength sufficient for curing. The curing of the mold composition is preferably conducted in a circulatory air oven. Therein, the maximum temperature is held not significantly above the polymerization temperature for the furan resin, generally 350° F. or less. The curing time at this temperature is about 2 hours for each inch of mold part crosssection. These conditions will fully polymerize the binders and expel the volatiles. The resultant product is moisture free to below 1% moisture by weight, is durable with accurately formed surfaces corresponding to the desired recesses for the thermit welding application, with thermal properties compatible with thermit welding using copper and other conventionally used weld metals, with thermal shock characteristics resistant to the temperature excrusions in thermit welding, and with refractory properties allowing for disassembly of the mold assembly and release of the completed connector assembly without the need for special worker protection.

We claim:

1. A high temperature mold having a cavity adapted to retain molten metal, said mold being comprised by weight of about 85 to 92½% of an aggregate predominantly comprised of carbon and silica and a lesser amount of alumina combined with about 7½ to 12% of a binder system comprising a mixture of at least two non-hygroscopic, thermoset resins having differing polymerization temperatures, and said body means having a moisture content of less than about 1% by weight.

2. A high temperature mold as recited in claim 1, wherein one of said resins is a phenolic resin.

3. A high temperature mold as recited in claim 1, wherein one of said resins is a furan resin.

4. A high temperature mold as recited in claim 1, wherein one of said resins is a phenolic resin and another of said resins is a furan resin.

5. A high temperature mold as recited in claim 4, wherein the difference between said polymerization temperatures is around 200° F. or less.

6. A high temperature mold as recited in claim 1, wherein the aggregate is about 90% by weight and said polymerized thermosetting resins are about 10% by weight.

7. A mold assembly for thermit reaction welding of connector members comprising:
a plurality of compression molded components interengageable along parting surfaces and having interior surfaces defining an outwardly opening cavity adapted to receive and react a thermit reaction welding mixture, an interior cavity interconnected with said outwardly opening cavity adapted to received reacted molten metal and at least two exteriorly opening passages communicating with the interior cavity adapted to received said connector members therethrough with the terminal portions of the connector members disposed within said interior cavity for integral interconnection by the solidified reacted molten metal to form a connector assembly, the parting surfaces being arranged to permit free separartion of the mold components after solidification, said mold components consisting of a carbon, silica and alumina containing aggregate bonded by a non-hygroscopic thermoset resin mixture containing at least one phenolic resin, said mold component having molded surfaces substantially defining the parting surfaces, the cavities and the passages.

8. The mold assembly recited in claim 7, wherein the aggregate comprises 87½ to 92% by weight of said mold component and the cured resin comprises 7½ to 12% by weight of said mold component.

9. The mold assembly recited in claim 7, wherein said resin mixture comprises a phenolic resin and a furan resin.

10. The mold assembly recited in claim 9, wherein said phenolic resin and said furan resin are in substantially equal proportions by weight.

11. A high temperature mold composition comprising:
an admixture of an aggregate and a resinous binder system, said aggregate comprising carbon, silica and alumina in the range of 88 to 92½% by weight, and a resinous binder system comprising a mixture of at least two thermosetting resins, including at least one phenolic resin, in the range of 7½ to 12% by weight, said aggregate and said binder system being curable to a moisture content of below about 1% by weight.

12. The mold composition recited in claim 11, wherein said binder system includes a furan resin.

13. The mold composition recited in claim 12, wherein said phenolic resin and said furan resin are present in substantially equal amounts by weight.

14. The mold composition recited in claim 13, wherein said aggregate comprises by weight about 26 to 29% carbon with the remainder being volatiles and ash wherein about 47.5 to 50% by weight of said ash content is silica.

15. The mold composition as recited in claim 14, wherein said ash content includes 8 to 8.4% aluminum by weight.

16. The mold composition as recited in claim 15, wherein said aggregate comprises about 90% by weight and said binder system comprises about 10% by weight.

17. A method of making a high temperature mold comprising the steps of:
preparing an admixture of an aggregate comprised generally of carbon, silica and alumina and a resinous binder mixture, said aggregate being added in an amount of around 88 to 92½% by weight, excluding volatiles, said resinous binder mixture being added in an amount of around 7½ to 12% by weight, excluding volatiles, and including at least two non-hygroscopic thermosetting resins having substantially differing polymerization temperatures;
compressively molding the admixture to define the desired contours of the mold; and,
heating the mold admixture to a curing temperature around but not significantly above the highest polymerization temperature of said resins sufficient to cure said molded admixture and reduce the moisture content thereof to below around 1% by weight.

18. The method recited in claim 17, wherein said polymerization temperatures differ by about 200° F. thereby providing progressively increasing strength to said molded admixture during said curing.

19. The method recited in claim 18, wherein one of said binders is a phenolic resin having a polymerization temperature of around 120° F.

20. The method recited in claim 19, wherein said other resin is a furan resin having a polymerization temperature of around 300° F.

21. The method recited in claim 20 wherein said curing temperature is around 350° F.

22. The method recited in claim 21, wherein said binder system mixture consists of a furan resin and a phenolic resin present in substantially equal weight amounts.

23. The method recited in claim 22 wherein said heating is for a time of around 2 hours per inch of molded cross-section.

24. A high temperature mold resistant to thermal shock and with improved refractory properties comprising:
body means including a molten metal retaining cavity therein, said body means comprising aggregate formed of fine particulars containing substantially equal amounts of carbon and silica and a lesser amount of alumina, said carbon and silica being present in alternating places and said aggregate being bound by a non-hygroscopic thermoset resinous binder.

25. A high temperature as recited in claim 24, wherein carbon and silica comprise by weight about 67 to 74% of the aggregate.

26. A high temperature mold as recited in claim 25, wherein said aggregate comprises a mined product having a content by weight of about 35 to 39% carbon, 32 to 34% silica and 5 to 7% alumina.

27. A high temperature mold as recited in claim 24, wherein said aggregate has a particle screen size of about 10 by 0.

28. A thermal shock resistant and refractory mold composition comprising: an aggregate mined product containing carbon, silica and alumina, said aggregate being in finely particulated form and the carbon and silica being present in alternating plates, and an effective amount of thermosetting non-hygroscopic resinous binder.

29. A mold composition as recited in claim 28, wherein said mined product comprises by weight about 35 to 39% carbon, 32 to 34% silica and 5 to 7% alumina.

30. A mold composition comprising:
an admixture of an aggregate and a resinous binder system, said aggregate comprising, by weight, about 26% to 29% carbon with the remainder being volatiles and ash, said ash containing by weight about 47.5% to 50% silica and 8 to 8.4% aluminum, said resinous binder system comprising a phenolic resin and a furan resin present in substantially equal amounts by weight, said aggregate and said resinous binder system being present in the ranges of 88 to 92½% by weight and 7½ to 12% by weight respectively, said admixture being thermally curable to a moisture content of below about 1% by weight.

31. The mold composition as recited in claim 30 wherein said aggregate comprises about 90% by weight and said binder system comprises about 10% by weight.

32. A high temperature mold resistant to thermal shock and with improved refractory properties comprising:
body means including a molten metal retaining cavity therein, said body means comprising a mined aggregate formed of fine particulars containing substantially equal amounts of carbon and silica present in alternating plates of carbon and silica and having a content by weight including about 35 to 39% carbon, 32 to 34% silica and 5 to 7% alumina, said aggregate being bound by a non-hygroscopic, thermoset resinous binder.

* * * * *